Figure 1:
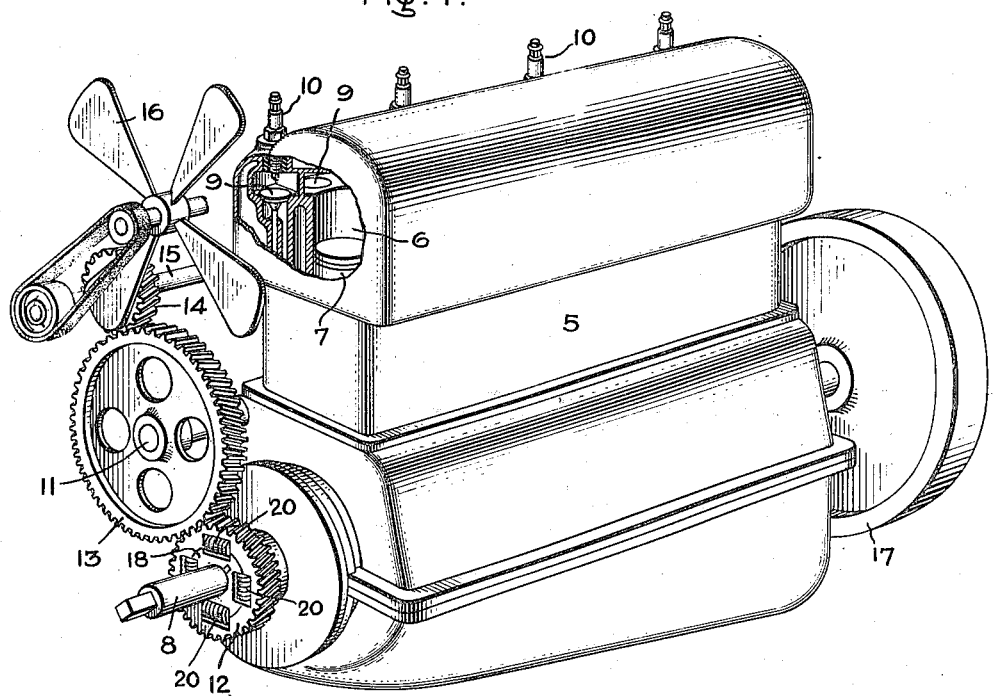

E. J. GUAY.
ENGINE.
APPLICATION FILED FEB. 26, 1917.

1,282,571.

Patented Oct. 22, 1918.

Inventor:
Emile J. Guay,
by Albert G. Davis
His Attorney.

UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

ENGINE.

1,282,571.  Specification of Letters Patent.  Patented Oct. 22, 1918.

Application filed February 26, 1917. Serial No. 150,946.

*To all whom it may concern:*

Be it known that I, EMILE J. GUAY, a citizen of the United States, residing at Lynn, county of Essex, State of Massachusetts, have invented certain new and useful Improvements in Engines, of which the following is a specification.

In an investigation of the action of engines, and particularly those of the internal combustion multi-cylinder type such as are used for automobiles, aeroplanes, and similar work, I have discovered certain peculiar and hitherto unsuspected actions which are detrimental to the operation of the engines, and have discovered a means for minimizing or preventing such actions.

It may be assumed that the end of the crank shaft of an engine which is connected to the fly wheel and to the load must under ordinary conditions run at a substantially uniform angular velocity. This assumption has hitherto been made with respect to the whole crank shaft, but my investigations have demonstrated that it is not true of the whole crank shaft, and particularly that it is not true of the end remote from the fly wheel, which is generally the front end, and will hereafter be alluded to as such.

Each connecting rod applies rapidly alternating stresses to this shaft, tending now to oppose and now to accelerate its rotation. If the shaft is of finite diameter it must twist slightly under each such application of force, so that there must exist in the front end of the shaft an angular velocity which is not uniform, but which is, to a certain extent at least, irregular. This irregularity of velocity is particularly noticeable, I find, at high engine speeds, when it seems to be accompanied by a whipping or violent distortion of the crank shaft itself.

The result of this variation of angular velocity is to expose to a very considerable strain the train of gears or other mechanism which drives the cam shaft of the engine, and which also usually drives the pump and the ignition apparatus. I have found cases in which this variation of angular velocity causes a whipping of the cam shaft sufficient to open certain valves at times when they ought to be closed, thus materially reducing the efficiency of the engine.

In less extreme cases the action above discussed produces abnormal strains on the gearing itself; the cam shaft having a certain inertia tends to run at a constant angular velocity, but the gear which is fixed to the front end of the crank shaft and which ordinarily meshes with a gear on the cam shaft tends to run at an angular velocity which is not uniform, due to the action above set forth. The result, as I have found, is that the strains existing in these gears are very much greater than the strains which have been hitherto assumed to exist and which would exist if the angular velocity of the driving gear were uniform. I have been able, for example, in the case of a six-cylinder engine, to find on the cam shaft gear teeth worn spots, one corresponding to each cylinder, corresponding to the time or portion of revolution for which the crank shaft was accelerated, and have also been able to find on the backs of the gear teeth corresponding worn spots showing that at six times in the revolution of the engine there was actually a reversal of torque, that is to say, that at such times the inertia of the crank shaft was tending to drive the engine.

The result of this action and of the vibration set up in the manner above specified is not only a reduction of the engine efficiency and a general absence of smoothness of action and a general tendency to wear and destruction, but is particularly noticeable in its effect on the gears themselves. Certain gears of the type shown in the Miller Patent No. 1,061,770, dated May 13, 1913, have been destroyed in a few minutes operation, although these gears were sufficiently strong to endure for a long time the calculated stresses.

I have also found that every crank shaft has a natural or definite period of oscillation and that when the engine speed reaches such a value that the time between successive explosions in the cylinders corresponds to the definite period of oscillation of the crank shaft, the force of the successive explosions is applied at a time to amplify the crank shaft oscillations. This may be termed the critical speed of the engine and when it is being passed through the crank shaft is subjected to blows of a very high value, which results in high stresses being set up therein, which stresses may be transmitted to any parts geared or otherwise connected thereto. This critical speed occurs at high engine speed and my invention is of particular importance in cases where engines are designed to run at speed above the critical as they must pass through this critical speed when in operation.

My improvement consists in a means of compensating for this irregular torque or irregular angular velocity of the driving gear of the train, and of delivering to the driven gear, as for example the cam shaft gear, a torque which is substantially uniform or sufficiently uniform to avoid the more serious difficulties above mentioned, by interposing in the train of gears an elastic or yielding means.

If, however, this elastic or yielding means were of the ordinary spring-gear type there would be a tendency for this very elasticity to create additional vibrations or surging; and further, the cam shaft would lag behind its calculated or predetermined position by an amount depending on its counter torque, which would introduce an uncertainty in the timing of the engine with a corresponding reduction in output and in efficiency.

I therefore provide in the train of gearing or other mechanism referred to an elastic or yielding means which is so constructed and arranged that it does not act or function as a yielding means, but acts or functions as a solid means, up to a certain counter torque, and that thereafter it deflects or yields, more or less in proportion to the counter torque, above the predetermined minimum for which it is supposed to be solid. In the specific form preferred I provide a gear which acts as a solid gear for transmitting a torque up to a certain number of foot pounds, and which thereafter acts as a flexible gear; which begins to act as a flexible gear only at a predetermined torque, and yields in proportion to the additional torque or in some definite relation thereto. The gear is also so arranged that it may yield or flex in either direction.

In general I find it desirable to adjust the gear so that when the engine is running at its normal speed the gear is solid, but that when the engine is pushed any higher than normal speed, or to any speed at which there is any considerable tendency to vibrate, the gear yields.

Figure 2:
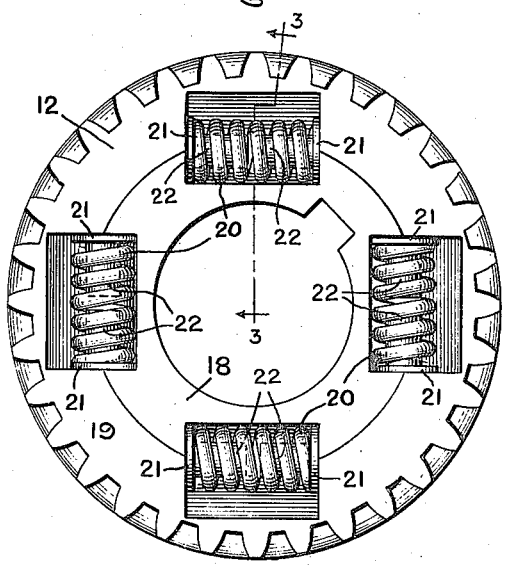

In the accompanying drawing is illustrated an embodiment of my invention, wherein Figure 1 is a perspective view of an internal combustion engine; Fig. 2 is a view in elevation of an elastic gear wheel, and Fig. 3 is a section taken on line 3—3 of Fig. 2.

5 indicates an internal combustion engine of any suitable construction having a number of cylinders 6 each containing a piston 7 that is connected to the main shaft 8 in the usual way. Each cylinder is provided with the usual admission and exhaust valves 9 and an ignition device 10. Each valve has its usual stem and operating means through which it is raised and lowered with respect to its seat by the cam shaft 11.

On the main shaft is an elastic gear wheel 12, to be described more fully later, which drives the gear wheel 13 on the cam shaft. The gear is preferably of the type having non-metallic teeth. For example, it may be of the well known type composed of spinnable textile fibers shown in the Miller patent above referred to. This gear meshes with the gear wheel 14 mounted on the pump or pump and magneto shaft 15. The shaft 15 also drives the cooling fan 16 through suitable means such as a belt and pulleys. With certain critical speeds and vibrations incident thereto the stresses on the teeth of the intermediate gear and the presures on the bearings are sometimes very heavy. On the engine shaft is the fly wheel 17.

Figure 3:
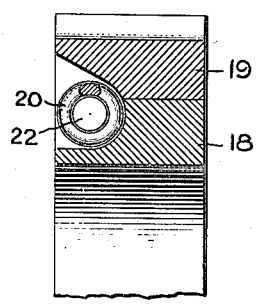

Referring to Figs. 2 and 3, the elastic gear wheel 12 comprises an inner member 18 that is keyed on the engine shaft, and an outer member 19 of ring formation that snugly fits the inner member but is capable of turning angularly thereon under certain circumstances. The periphery of the member 19 is provided with gear teeth of any suitable formation. As shown, the teeth are helically cut, which is advantageous as it tends to decrease noise. Formed in the two members are recesses in which are located coiled compression springs 20, the ends of which rest on washers 21 that bear uniformly on the two members of the gear. The number of springs can be varied but it is desirable to use several and space them equally so as to obtain the desired spring pressure and also to distribute the work equally around the axis. As will be seen, all of the springs work together and in the same direction. That is to say, any relative angular movement of the outer member on the inner in either direction stresses all of the springs in the same direction and by the same amount. It is important that these springs shall all be under initial compression so that the two members of the gear wheel are to all intents and purpose a single unit so long as the load is below a predetermined maximum. My experience with certain engines which I have tested is to the effect that these springs, considered collectively, should be capable of resisting a pressure that is equal to from six to eight times the pressure on the gear teeth at low and moderate engine speeds. On the other hand, when the load or tooth pressure becomes abnormal, as it would with high engine speeds, say 2700 to 2800 R. P. M. for example, the springs should yield by a small amount and in this manner prevent the transmission of vibrations and shocks which are so objectionable in internal combustion engines. As a result of this construction the timing of the valves will remain true to the original setting, except under very high speed conditions, when it will depart but only very slightly, not more than 1½ or 2%. The figures above mentioned are given as illustrations and not as limitations of my invention because engines differ somewhat in their characteristics, but in any event the total spring pressure should greatly exceed the tooth pressure under normal low and moderate engine speeds.

In order to render it possible to operate the engine in the event of breakage of one or more of the springs 20, a stop or limiting device is provided to restrict the relative angular movements of the members of which the gear wheel is composed. As shown, it comprises a pair of pins 22 located within each spring containing recess. The ends of the pins are separated by a small space but if one or more springs break this space will be closed up due to a small angular movement of one member on the other. This of course destroys the exact timing of the valves, but nevertheless permits the engine to be operated until such time as suitable repairs can be made. Owing to the fact that the springs are only subjected to the effects of compression and expansion at infrequent periods, the danger of breakage due to crystallization is negligible.

My improvement also has a direct bearing on the efficiency of the engine. If the valves, due to vibration and shock of the parts, do not function properly at high engine speeds, some of the charge during the compression stroke will be lost and the combustion will take place in the exhaust manifold, or a portion of the charge on the firing stroke will escape without doing useful work. Tests show a gain of from 10 to 15% in economy at high speeds of an engine equipped with my improved gearing over one with solid metal gears.

In an earlier part of this specification reference was made to the fact that the backs of certain of the teeth in the cam shaft gear showed wear occasioned by shocks or vibrations of the parts. I have demonstrated by certain tests that this back pressure is a material and perhaps the greatest one affecting the gearing. A gear constructed in accordance with Fig. 2 and having in addition a small, thin copper tongue or key arranged to connect the two members and prevent relative movement except under heavy stress, was mounted on an engine in the manner shown in Fig. 1. The engine was then operated at such a speed as to cause the main shaft to whip or vibrate. On removing the tongue or key it was found that all evidences of pressure or cutting were on the back side thereof, instead of on the front side where it was natural to expect to find it.

I desire to emphasize the fact that the spring or springs between the two members of the gear wheel must be under an initial compression which is substantially greater than the working or tooth pressure at low and moderate engine speeds, because otherwise very small pressures will cause the parts to move one on the other and set up highly objectionable oscillations and shocks. Furthermore, if only a slight pressure were required to move one part on the other, the timing would be seriously disturbed to the serious detriment of the engine, especially in starting.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination in an engine having a main shaft, means driven thereby which has a fly wheel effect, a valve, and a secondary shaft which operates the valve, of yielding means connecting the main shaft to the secondary shaft for driving it, said yielding means being normally inactive, but allowing a yielding action in either direction above a certain predetermined torque.

2. An internal combustion engine, comprising a cylinder, a piston, valve means for controlling the action of the engine, a shaft for actuating the valve means, a main shaft, and means driven thereby which has a fly wheel effect, in combination with gear wheels between the shafts for transmitting motion from the main to the valve shaft, one of said wheels comprising two relatively movable members and a yielding means which unites them and is under an initial stress that is greater than the pressure to which the gear teeth are subjected at moderate engine speeds.

3. An internal combusition engine comprising a cylinder, a piston, valves for controlling the action of the engine, a shaft for actuating the valves, a second shaft, a main shaft, means driven thereby which has a fly wheel effect, and gear wheels between the said valve and second shafts, in combination with a gear wheel that is driven by the main shaft and drives said valve and second shafts, said gear wheel comprising two relatively movable members and a yielding means through which power is transmitted, said means being under an initial stress that is greater than the pressure to which the teeth of the driving and driven gear are subjected at moderate engine speeds.

4. An internal combustion engine comprising a cylinder, a piston, valves for controlling the action of the engine, a main shaft, means driven thereby which has a fly wheel effect, and secondary shafts, in combination with gear wheels between the shafts, one of said gear wheels having non-metallic teeth and another composed of two members which are relatively movable, and a means connecting the two members together that under moderate engine speeds holds the members against independent movement, but under higher engine speeds permits one to move with respect to the other.

5. An internal combustion engine, comprising cylinders, pistons therefor, valve means for controlling the action of the engine, a shaft for actuating the valve means, a main shaft, and a fly wheel that is attached to one end of the main shaft, in combination with a train of gear wheels located at the end of the engine opposite the fly wheel, said train including a gear comprising two principal members, one of which is fast on its shaft and the other loose, and a spring through which torque is transmitted between the members, said spring being under an initial stress that is several times greater than the pressure to which the gear teeth are subjected at moderate engine speeds.

6. The combination in an internal combustion engine of a crank shaft, means driven thereby which has a fly wheel effect, a cam shaft, and a driving mechanism between said shafts which includes a gear wheel driven from the crank shaft, the connection between said gear wheel and the crank shaft comprising a yielding means under such compression that it does not yield under normal loads but may yield in either direction in case of excess loads.

7. An internal combustion engine comprising cylinders, pistons for the cylinders, valve means for controlling the action of the pistons, a shaft for actuating the valve means, a main crank shaft to which the pistons are connected, and fly wheel means on the shaft, in combination with gear wheels between the main and cam shafts, one of said wheels comprising a hub member which is rigidly affixed to its shaft and a second member mounted on the first for relative angular movement thereon, with yielding means between the members which are under sufficient initial compression to prevent relative angular movement of the members at moderate engine speeds but which yield at higher engine speeds and permit such movement to take place in either direction depending upon the direction of application of the applied force.

In witness whereof, I have hereunto set my hand this 23d day of February, 1917.

EMILE J. GUAY.